(12) United States Patent
Kishore et al.

(10) Patent No.: US 11,166,253 B2
(45) Date of Patent: Nov. 2, 2021

(54) DATA CENTER AUTOMATIC INVENTORY AND LOCATION DATA POPULATION AND RECOVERY USING MESH NETWORK

(71) Applicant: Dell Products L.P., Round Rock, TX (US)

(72) Inventors: Saurabh Kishore, Round Rock, TX (US); Jeffrey Lairsey, Round Rock, TX (US); Sudhir Shetty, Cedar Park, TX (US); Alex Rote, Hutto, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/832,993

(22) Filed: Mar. 27, 2020

(65) Prior Publication Data
US 2021/0306976 A1    Sep. 30, 2021

(51) Int. Cl.
*H04W 64/00*    (2009.01)
*H04W 84/18*    (2009.01)

(52) U.S. Cl.
CPC .......... *H04W 64/003* (2013.01); *H04W 84/18* (2013.01)

(58) Field of Classification Search
CPC ............................ H04W 64/003; H04W 84/18
USPC ..................................................... 455/456.1
See application file for complete search history.

(56) References Cited

U.S. PATENT DOCUMENTS

| | | | | |
|---|---|---|---|---|
| 8,674,822 B2 * | 3/2014 | Priyantha | ............. | G06Q 10/087 340/505 |
| 2008/0032705 A1 * | 2/2008 | Patel | ..................... | H04L 65/104 455/456.1 |
| 2009/0138336 A1 * | 5/2009 | Ashley, Jr. | ......... | G06Q 30/0207 455/456.1 |
| 2015/0245179 A1 * | 8/2015 | Jarvis | ...................... | H04L 45/02 455/456.1 |
| 2017/0214117 A1 * | 7/2017 | Gracyk | .................. | G01S 13/767 |
| 2020/0169874 A1 * | 5/2020 | Wagner | ................... | H04W 4/02 |

OTHER PUBLICATIONS

Jeffrey Lairsey et al., System and Method for Determining Location and Navigating a Datacenter using Augmented Reality and Available Sensor Data, U.S. Appl. No. 16/263,968, filed Jan. 31, 2019.

* cited by examiner

*Primary Examiner* — William Nealon
(74) *Attorney, Agent, or Firm* — Terrile, Cannatti & Chambers; Stephen A. Terrile

(57) ABSTRACT

A mechanism is provided for utilizing location services of a mesh network to aid in tracking the presence and location of information handling systems in an environment having a large number of systems installed. In one embodiment, each information handling system joins a mesh network to form localized clusters. Mesh network location services aid the new system in finding a vertically-closest node in the cluster or a neighboring cluster. With this information, the new system can determine in which rack the system is installed. This information can then be provided to an inventory management system for inclusion of the information handling system in an inventory tracking database. Embodiments are also configured to determine when an information handling system is removed from the mesh network and can inform the inventory management system of the removal in order to determine whether additional steps need to be taken in response.

14 Claims, 7 Drawing Sheets

DATA CENTER AUTOMATIC INVENTORY AND LOCATION DATA POPULATION AND RECOVERY USING MESH NETWORK

BACKGROUND OF THE INVENTION

Field of the Invention

The present invention relates to information handling systems. More specifically, embodiments of the invention relate to maintaining inventory and location of information handling systems in a data center using proximity location detection of a mesh network.

Description of the Related Art

As the value and use of information continues to increase, individuals and businesses seek additional ways to process and store information. One option available to users is information handling systems. An information handling system generally processes, compiles, stores, or communicates information or data for business, personal, or other purposes thereby allowing users to take advantage of the value of the information. Variations in information handling systems allow for information handling systems to be general or configured for a specific user or specific use such as transaction processing, airline reservations, enterprise data storage, or global communications. In addition, information handling systems can include a variety of hardware and software components that can be configured to process, store, and communicate information and may include one or more computer systems, data storage systems, and networking systems. Further, information handling systems can be incorporated in a variety of environments, including, for example, desktop devices, mobile devices, and large data center configurations with hundreds-to-thousands of information handling systems in multiple environmentally controlled rooms.

In a data center environment where there can be thousands of information handling systems, managing and tracking such systems presents challenges to data center management. These challenges can include, for example, maintaining an inventory of those information handling systems present in the data center and tracking the location of each individual system and responding quickly to an unauthorized movement of an information handling system.

SUMMARY OF THE INVENTION

A system, method, and computer-readable medium are disclosed for utilizing location services of a mesh network to aid in tracking the presence and location of information handling systems in an environment having a large number of systems installed.

In one embodiment, a computer-implemented method for locating a first node in a data center is provided. The method includes: joining, by the first node, a mesh network in the data center; determining, by the first node, a physical location of the first node within the data center using information provided by the mesh network; and informing a data center management system of the location of the first node.

In one aspect of the above embodiment, joining the mesh network includes requesting, by the first node, to join a cluster of one or more nodes within the mesh network. The request is transmitted to a lead node of the cluster if the lead node responds to the request to join the mesh network, and the mesh network includes one or more clusters each having a corresponding lead node. In a further aspect, the lead node of the cluster is a physically closest lead node to the first node.

In another aspect, determining the physical location includes finding a second node that is positioned physically approximately vertical to the first node, and requesting location information associated with the second node where the location information includes a server rack identifier. In a still further aspect, finding the second node includes requesting a list of cluster members from the lead node, finding by the first node a physically closest cluster member to the first node, and determining whether the physically closest cluster member is positioned approximately physically vertical to the first node. In another further aspect, the method further includes using a mesh network location protocol to perform finding the physically closest cluster member and determining whether the physically closest cluster member is positioned approximately physically vertical to the first node.

In yet another aspect, if the physically closest cluster member is not positioned approximately physically vertical to the first node, the method further includes requesting a list of neighbor cluster members from a neighbor cluster to the cluster, finding a physically closest neighbor cluster member to the first node, and determining whether the physically closest neighbor cluster member is positioned approximately physically vertical to the first node. In yet a further aspect, requesting the list of neighbor cluster members includes requesting the lead node to request the list of neighbor cluster members from a neighbor lead node of the neighbor cluster.

In yet another aspect, determining the physical location of the first node further includes: requesting, by the first node, identification of filled slots in the server rack identified by the server rack identifier; determining a distance from the second node to the first node; and, determining a slot occupied by the first node in the server rack using the distance and the information associated with filled slots in the server rack. In a further aspect, the information regarding filled slots is provided by one of the lead node or the data center management system. In another further aspect, the method further includes using the mesh network location protocol to perform determining the distance from the second node to the first node.

In another aspect of the above embodiment, if a lead node does not respond to the request to join the mesh network, joining the mesh network further includes creating a new cluster having the first node as the lead node. In a further aspect, determining the physical location of the first node includes requesting by the first node the physical location information from data center management system, and storing the physical location information at the first node.

In another aspect, the method further includes removing the first node from the mesh network, and informing by the lead node the data center management system of the removal of the first node. In another aspect of the above embodiment, the location of the first node includes identifiers for one or more of building, room, aisle, server rack, and slot.

Another embodiment provides an information handling system that includes a processor, a first network interface coupled to the processor and a first network, a wireless network interface coupled to the processor, and a non-transitory, computer-readable storage medium embodying computer program code, the non-transitory, computer-readable storage medium being coupled to the processor, the computer program code interacting with a plurality of computer operations and including instructions executable by the processor. The first network interface is configured to communicate with a data center management system coupled to the first network. The wireless network interface is configured to communicate with a wireless mesh network in a data center and determine a relative location of the information handling system to one or more wireless mesh network member nodes. The instructions are configured to cause the processor to join the wireless mesh network, determine a physical location of the information handling system within the data center using information provided by the mesh network, and inform a data center management system of the physical location of the information handling system.

In one aspect of the above embodiment the instructions are further configured to cause the processor to request to join a cluster of one or more nodes within the mesh network. The request is transmitted by the wireless network interface to a lead node of the cluster if the lead node responds to the request to join the mesh network, and the mesh network includes one or more clusters each having a corresponding lead node. In a further aspect, the instructions are further configured to cause the processor to find a second node that is positioned approximately physically vertical to the information handling system, and request location information associated with the second node wherein the location information includes a server rack identifier. In still a further aspect, the instructions are further configured to cause the processor to request a list of cluster members from the lead node, find a physically closest cluster member to the information handling system, and determine whether the physically closest cluster member is positioned approximately physically vertical to the information handling system. In yet a further aspect, the instructions are further configured to cause the processor to, if the physically closest cluster member is not positioned approximately physically vertical to the information handling system, request a list of neighbor cluster members from a neighbor cluster to the cluster, find a physically closest neighbor cluster member to the information handling system, and determine whether the physically closest neighbor cluster member is positioned approximately physically vertical to the information handling system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method, and computer-readable medium are disclosed for utilizing location services of a mesh network to aid in tracking the presence and location of information handling systems in an environment having a large number of information handling systems installed. In one embodiment, each information handling system is incorporated into a Bluetooth Low Energy (BLE) mesh network to enable the systems to form localized clusters within the mesh network. When a new information handling system joins a cluster, mesh network location services aid the new system in finding an approximately-vertical closest node in the cluster or a neighboring cluster. With this information, the new information handling system can determine in which rack the system is installed. The new information handling system can also request additional location-related information from other members of the mesh network. This information can then be provided to an inventory management system for inclusion of the information handling system in an inventory tracking database. Embodiments are also configured to determine when an information handling system is removed from the mesh network and can inform the inventory management system of the removal in order to determine whether additional steps need to be taken in response of that removal.

For purposes of this disclosure, an information handling system includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
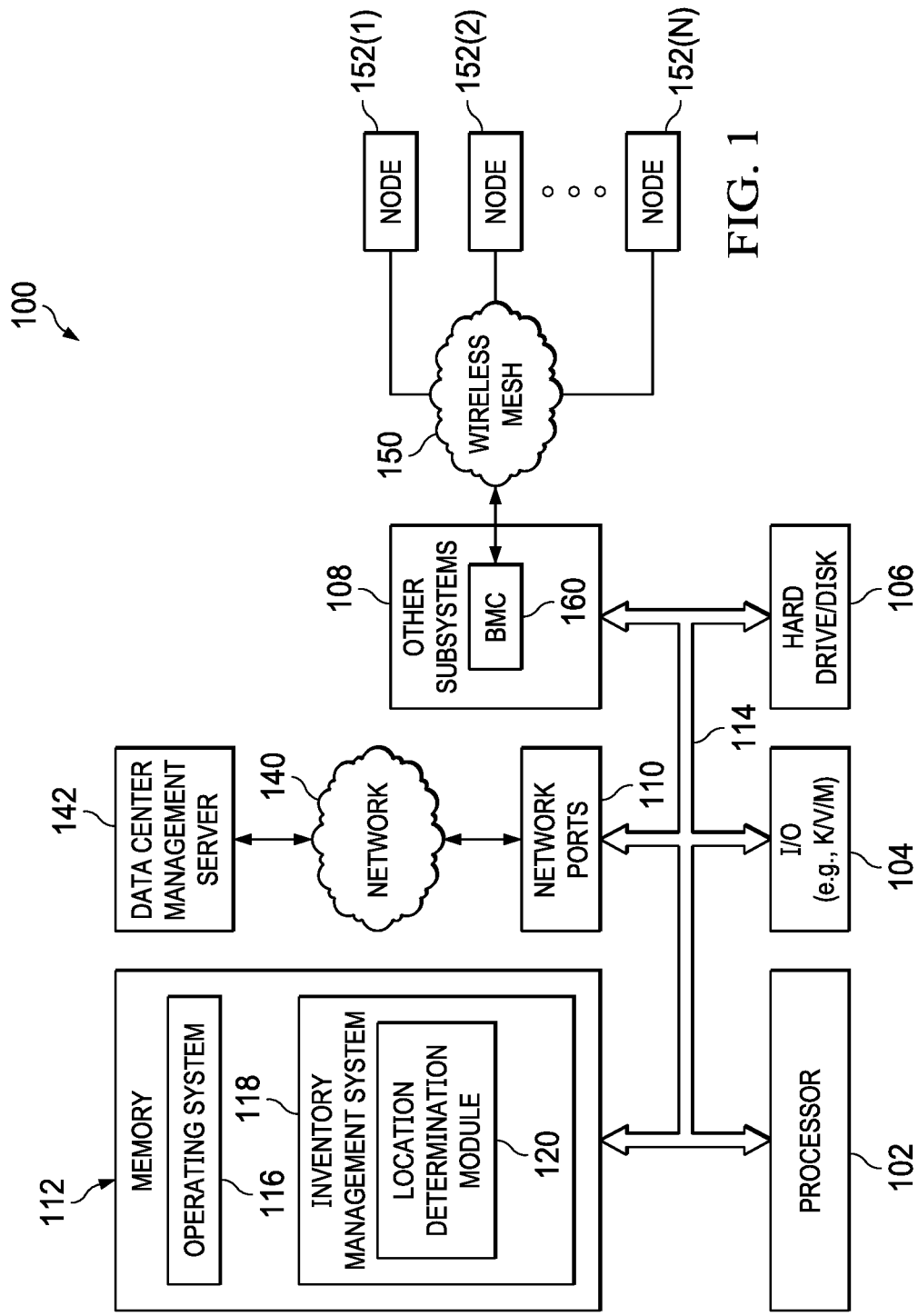
FIG. 1 is a generalized illustration of an information handling system that can be used to implement the system and method of the present invention.

FIG. 1 is a generalized illustration of an information handling system 100 that can be used to implement the system and method of the present invention. Information handling system 100 includes one or more processors (e.g., one or more processing cores or a central processor unit (CPU)) 102, input/output (I/O) devices 104, such as a display, a keyboard, a mouse, and associated controllers, a hard drive or disk storage 106, and various other subsystems 108, including a baseboard management controller (BMC) 160. In various embodiments, information handling system 100 also includes one or more network ports 110 providing communication interfaces to network nodes external to the information handling system. One example of a network port includes a network interface card (e.g., Ethernet) operable to connect to a network 140, which is likewise accessible by a data center management server 142. Information handling system 100 likewise includes system memory 112, which is interconnected to the foregoing via one or more buses 114. System memory 112 further comprises operating system 116 and in various embodiments may also comprise inventory management system 118.

Baseboard management controller (BMC) 160 provides out of band monitoring, maintenance, and control of various elements of information handling system 100. BMC 160 can incorporate a processing device distinct from processors 102 that provides various management functions for the information handling system. For example, BMC 160 can be responsible for power management, cooling management, and the like. "Baseboard management controller" is a term often used in the context of server systems, while in a consumer-level device, a BMC can be referred to as an embedded controller. A BMC included in a data storage system can be referred to as a storage enclosure processor, while a BMC included at a chassis of a blade server can be referred to as a chassis management controller and embedded controllers included in blades of a blade server can be referred to as blade management controllers. As illustrated, BMC 160 is coupled to a wireless communication interface, such as a Bluetooth or Bluetooth Low Energy (BLE) channel or other wireless mesh network capable protocols. A BLE channel network port is wirelessly coupled to a wireless mesh network 150 that is likewise accessible to nodes 152(1)-(N), and allows for communication between BMC 160 and similar baseboard management controllers of nodes 152(1)-(N). In other embodiments, a wireless communication interface can be coupled to the BMC 160 via a network port 110.

Capabilities and functions provided by BMC 160 vary based on the type of information handling system. BMC 160 can operate in accordance with an Intelligent Platform Management Interface (IPMI). One example of BMC 160 includes an integrated Dell Remote Access Controller (iDRAC). BMC 160 can communicate with various portions of information handling system 100 using one or more buses 114. BMC 160 utilizes various protocols and application programming interfaces (APIs) to direct and control processes for monitoring and maintaining information handling system 100. Examples of a protocol or API for monitoring and maintaining the system includes a graphical user interface, an interface defined by the Distributed Management Taskforce (DMTF) (e.g., Web Services Management (WS-MAN) or Management Component Transport Protocol (MCTP)), various vendor defined interfaces (e.g., Dell EMC Remote Access Controller Administrator (RACADM), Dell EMC OpenManage Server Administrator (OMSS), or Dell EMC OpenManage Deployment Toolkit (DTK)), and the like.

Inventory management system 118 performs location determination and updating functions subsequent to installation of the information handling system in a data center and communicates that information to data center management server 142. Location determination module 120 functions to determine the location of the information handling system in the data center through communication with remote nodes of wireless mesh network 150 and data center management server 142 as will be discussed more fully below. The location management operations improves overall efficiency of the data center (and thus the efficiency of the information handling system 100) by allowing for automated, real-time asset inventory and location updates, permitting quicker response to operational issues associated with the information handling system.

Figure 2:
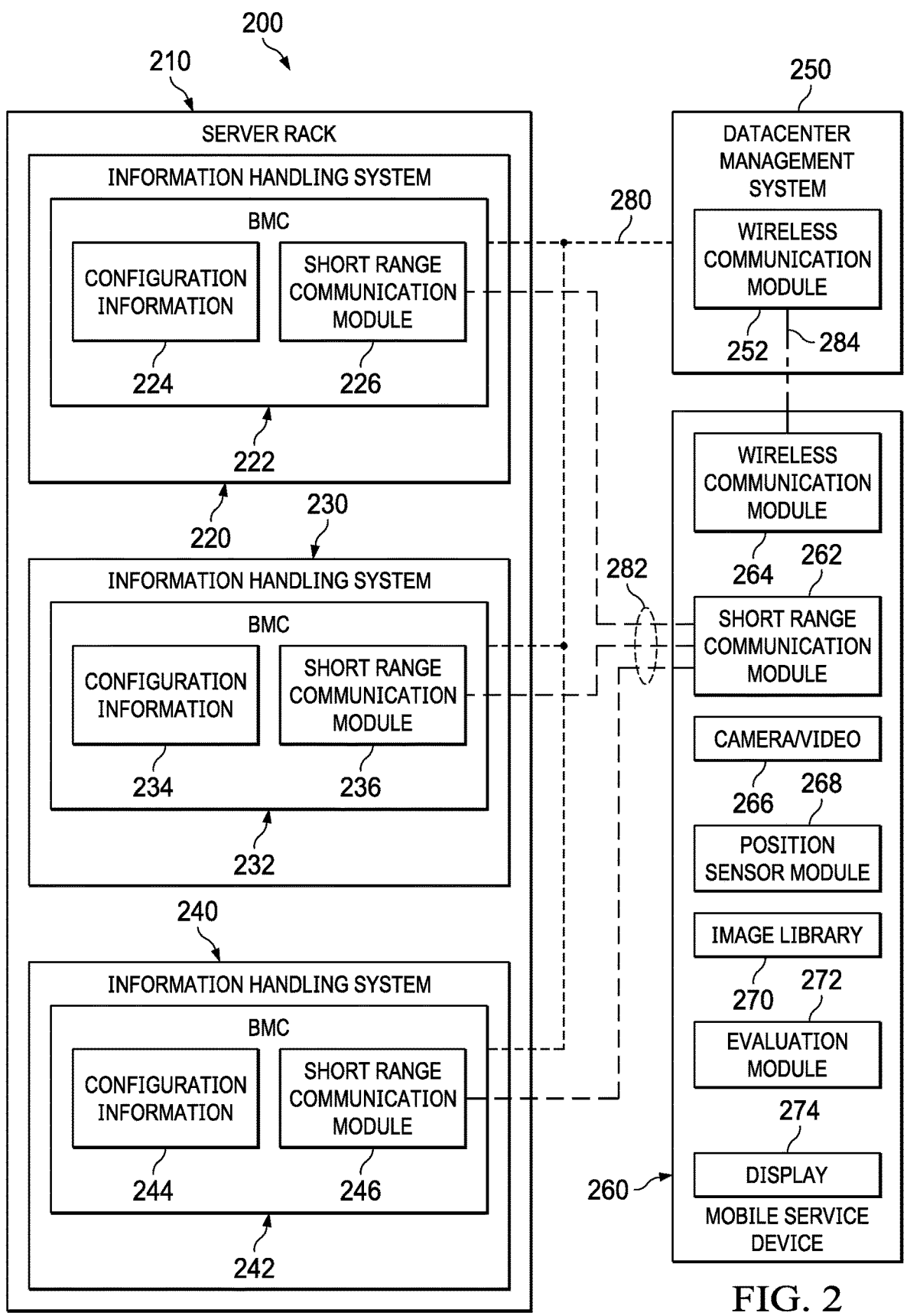
FIG. 2 is a simplified block diagram illustrating a portion of a data center, including a server rack, a data center management system, and a mobile service device.

FIG. 2 is a simplified block diagram illustrating a portion of a data center 200, including a server rack 210, a data center management system 250, and a mobile service device 260. Server rack 210 includes information handling systems 220, 230, and 240. Information handling systems 220, 230, and 240 can each represent variety of computing equipment such that illustrated by information handling system 100 in FIG. 1. As an example, information handling system 220 can be a top-of-rack switch, information handling system 230 can be a blade server, and information handling system 240 can be a storage server. Information handling systems 220, 230, and 240 can each include a hosted processing environment (not shown) that is configured to provide the processing tasks particular to the information handling system. Information handling systems 220, 230, and 240 each include a BMC 222, 232, and 242, respectively. Each BMC includes a network interface such that the BMCs are all connected together in a management network 280 with data center management system 250. Management network 280 can be a wired network, a wireless network, or a combination of wired and wireless networks, as determined by the application.

Each BMC includes configuration information (e.g., 224, 234, and 244) and a short-range communication module (e.g., 226, 236, and 246). The configuration information provides management information utilized by data center management system 250 to monitor, manage, and maintain the associated information handling system. Configuration information can include information about the physical configuration of the respective information handling system (e.g., 220, 230, and 240), and can also include information regarding the logical configuration of the information handling system. For example, where the information handling system is a blade server, the physical configuration information can include the make and model of the server, a service tag, a number of blades, and other physical information associated with the server. Configuration information can further include location information for the blade server in server rack 210 and for the server rack in data center 200. Logical configuration information can also include, for example, information associated with the health of the blade server in terms of physical operational status and in terms of logical operational status such as error and alert status information, and can also include information as to the installed operating systems, the workloads and processing tasks being performed by the blades, and other information that identifies uses to which the blade server is configured to perform.

Short-range communication modules 226, 236, and 246 include a wireless communication endpoint configured to establish a wireless communication link 282 to other similarly equipped devices (e.g., neighboring information handling systems (as will be discussed more fully below) and mobile service device 260). The short-range communication modules are configured to provide short connection range as compared with other wireless technologies, such as Wi-Fi or wireless cellular technologies. An example of a short-range communication module includes, for example, a communication endpoint communicating in accord with a Bluetooth standard, a Bluetooth low energy (BLE) standard, or another short-range communication standard, as implicated by the application. Embodiments of the present system provide a short-range communication standard supporting a wireless mesh network incorporating location capabilities.

Data center management system 250 is a centralized and unified processing resource for monitoring, managing, and maintaining information handling systems (e.g., 220, 230, and 240) through management network 280. Data center management system 250 can include a wireless communication module 252 configured to establish a wireless communication link 284 to another similarly equipped device (e.g., mobile service device 262). Wireless communication module 252 is configured to provide a medium connection range as compared with other wireless technologies, such as wireless cellular technologies. An example of such a medium-range communication module can include a communication endpoint configured in accord with various Wi-Fi standards, or another medium-range communication standard, as indicated by the application.

Mobile service device 260 is a device utilized by service technicians of data center 200 to perform monitoring, management, service, and maintenance of information handling systems (e.g., 220, 230, and 240), and can include, a mobile device such as a tablet, smart phone, and the like. Mobile service device 260 includes short-range communication module 262, wireless communication module 264, a camera/video system 266, an accelerometer module 268, and equipment image library 270, and augmented reality evaluation module 272, and a display 274.

Short-range communication module 262 establishes communication links 282 with short-range communication modules associated with the information handling systems (e.g., short-range medication modules 226, 236, and 246). Wireless communication module 264 can establish a communication link 284 with wireless communication module 252 of data center management system 250.

Camera/video system 266 is an integrated device of mobile service device 260 configured to obtain still or motion-based images from surroundings of the mobile service device. Position sensor module 268 is an integrated device that operates to track the motion of mobile service device 260 in three-dimensional space. From a particular location, position sensor module 268 can determine a relative location to which the mobile service device has been moved based upon accelerations experienced by the mobile service device. The position sensor module locates the mobile service device within data center 200 and can include a Global Positioning System (GPS) sensor to assist in determination of the location of the mobile service device or a mechanism for triangulating to determine location based upon establishment of one or more communication links similar to communication links 282 and 284. Position sensor module 268 can also include a gyroscope sensor to determine orientation of mobile service device 260, as needed.

Image library 270 includes information storage for image objects representing various data center equipment found in data center 200. Image objects in image library 270 can be provided by, for example, a manufacturer of data center equipment, where each image object is associated with a particular piece of data center equipment or particular family of data center equipment. A specific image object can provide in a primitive form the visible features of a specific type of information handling system (e.g., a top-of-rack switch). Image objects can also include other types of visibly distinguishing information such as QR codes, barcodes, service tags, or other information serving to visually identify the various equipment. Image library 270 can also include database information associated with each image object. The database information can include, for example, name, product code, SKU, or other information identifying the specific type of equipment, such as a number of network ports, associated switch fabric, speed, and throughput information, and the like. In general, the image objects and associated database information stored in image library 270 is available for comparison with the image data from the field of view of camera/video system 266 to assist evaluation module 272 in determining a location of mobile service device 260.

Evaluation module 272 provides and augmented reality visual depiction of surroundings of the mobile service device overlaid on display 274. Augmented reality visual display is generated by evaluation module 272 based upon various inputs to mobile service device 260, including image data from camera/video system 266, location information from position sensor module 268, configuration information from one or more of information handling systems 220, 230, and 240 received by a communication links 282, from data center management system 250 received via communication link 284, or from other input information available to the mobile service device. Specifically, evaluation module 272 operates to identify the data center equipment within server rack 210. Evaluation module 272 can then present image information from camera/video system 268 on display 274 and then, having matched the correct image objects to the elements of server rack 210, projects an augmented reality overlay of the matched image objects onto their respective elements of the server rack. In addition to the projected image objects, evaluation module 272 can display associated identifying information in the projected image objects that identifies the various elements of the server rack.

Figure 3:
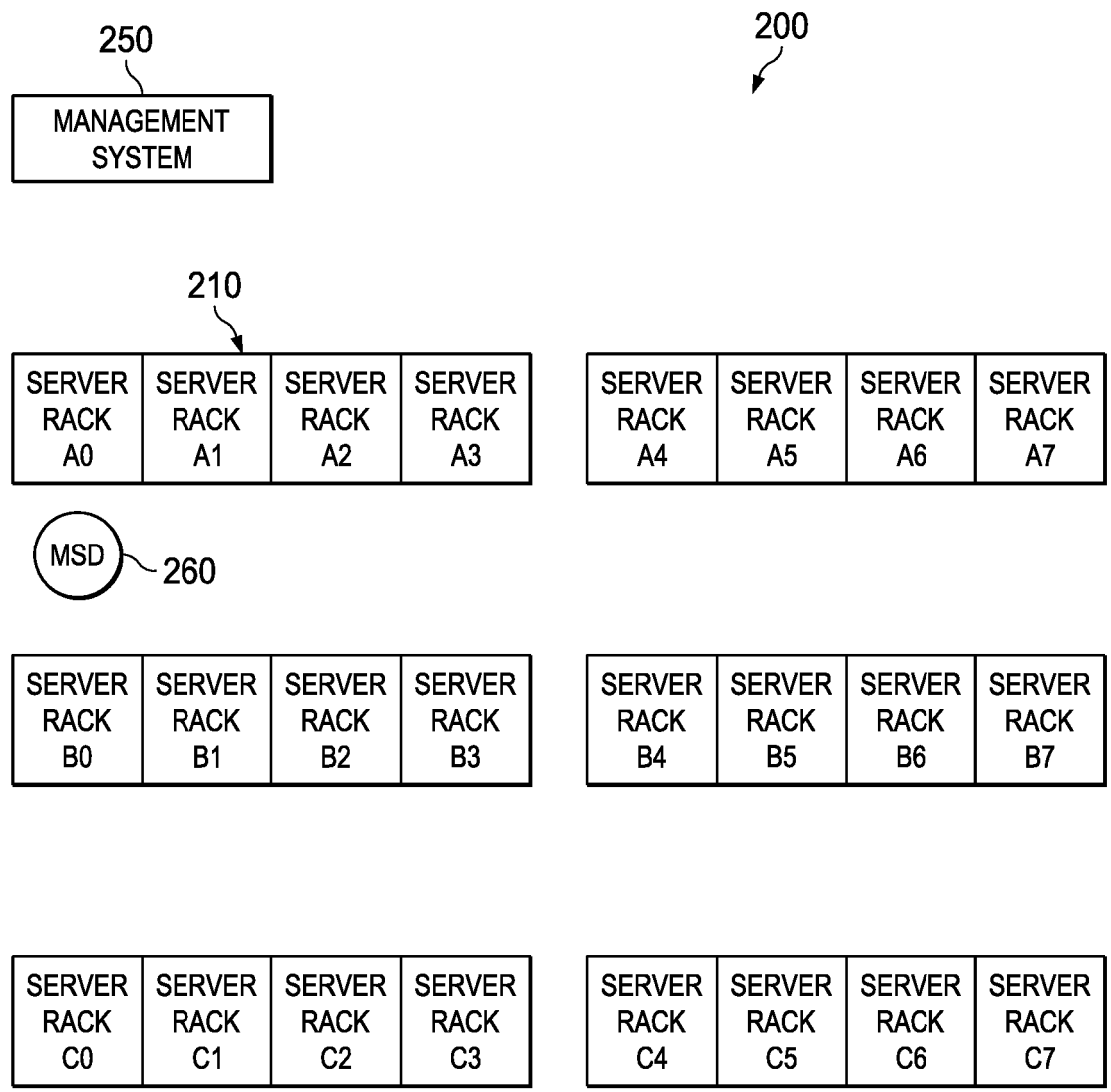
FIG. 3 is a simplified block diagram illustrating an expanded view of data center, including server rack, data center management system, and mobile service device, as shown in FIG. 2.

FIG. 3 is a simplified block diagram illustrating an expanded view of data center 200, including server rack 210, data center management system 250, and mobile service device 260, shown in FIG. 2. Data center 200 is depicted as including three rows of server racks. Each row is depicted as including eight server racks similar to server rack 210, with an aisle between each row of server racks. Additionally, each row of server racks includes an alley that permits data center technicians to move between rows. As illustrated, mobile service device 260 is located in front of server rack 210. As will be discussed more fully below, the additional location information provided by embodiments the present system allows for improvement in the ability for data center equipment to be reliably identified and located by data center management system 250 and mobile service device 260 within the various server racks of data center 200.

In a data center environment, the continuous activities of insertion and removal of information handling systems present a variety of challenges. These challenges include, for example: maintaining information handling system inventory, that is, which systems are presently installed within the data center (e.g., information related to a service tag associated with each system); maintaining location information related to each system and updating the location information when a system is relocated within the data center environment (e.g., aisle, rack room, slot number, and the like); and, asset theft detection and timely notification thereof. Present data center systems cannot provide notification in real time of when an information handling system disappears from a network or if the system has been moved if it reappears within the network. This makes it difficult to respond quickly in the event of asset theft or to maintain inventory in situations of asset removal or relocation.

Embodiments of the present system utilize short-range communication to establish a localized mesh network to aid in determining location of a new or relocated information handling system within a data center. Bluetooth Low Energy (BLE) is an example of a mesh protocol that enables nodes within a mesh to communicate with each other using message-oriented protocol. The mesh network can be used for local neighborhood monitoring of systems introduced into the mesh. Utilizing relative directional location capabilities of BLE, an information handling system provided to the mesh can determine the system's location in relation to previously existing nodes within the mesh network. Embodiments can utilize this information to find a closest approximately-vertical node in the mesh network to automatically aid the newly introduced system in determining the identity of a rack within which the system has been installed. That rack identifying information, in conjunction with information provided to the newly introduced information handling system regarding available slots in the rack and other location information, enables the system to determine where the system is located within the rack and, hence, the data center and to provide that information to a data center management system.

Figure 4:
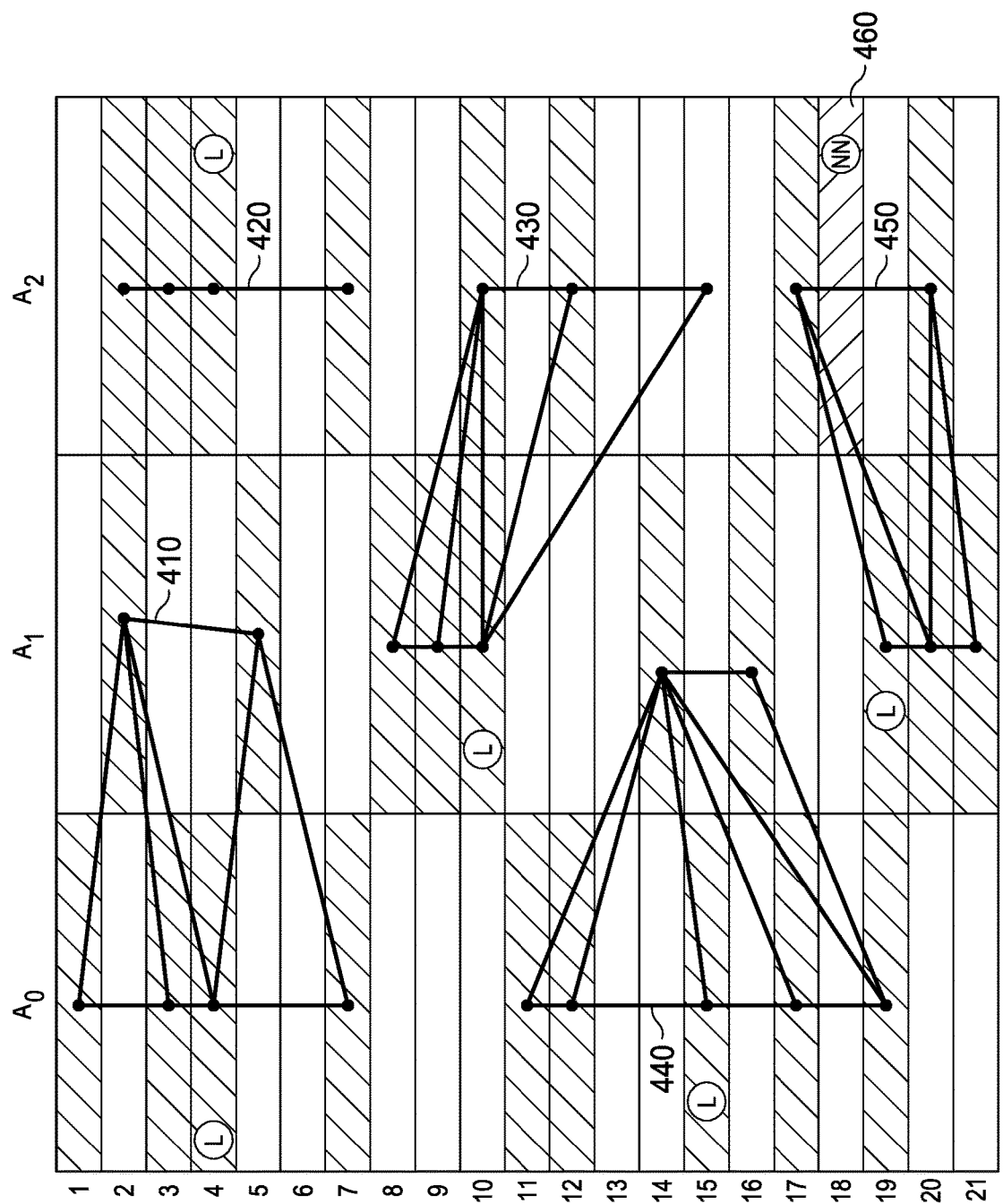
FIG. 4 is a simplified block diagram illustrating an example set of server racks and their system slots with an example of mesh network cluster formation.

FIG. 4 is a simplified block diagram illustrating an example of a set of server racks and their system slots along with an example of how nodes interact during mesh network cluster formation. Three server racks A0, A1, and A2 are illustrated where each rack has 21 available slots for information handling systems. Typically, a server rack can have mounted systems of differing heights and widths that can change a number of available slots within the server rack, but for sake of demonstration the illustrated slots are of a same height and width. Filled server rack slots are shaded in the illustration (e.g., slots [A0,1], [A1,8], and [A2,12] are filled with an information handling system [e.g., information handling system 100]). Empty server rack slots are not shaded (e.g., [A0,5], [A1,7], and [A2,6] are empty slots). As is known in the art, server racks provide both a physical location for a mounted information handling system and power couplings for those systems.

As discussed above, each information handling system includes a short-range communication module (e.g., 226, 236, and 246) that communicates wirelessly with one or more nodes within a certain distance of the system. Such communication is used to form a wireless mesh network, such as a BLE mesh network. In the server racks illustrated, each installed information handling system can be a member of a mesh network encompassing the entire data center.

To allow for location determination, the mesh network is divided into smaller neighborhoods, or clusters. Each information handling system listens for BLE signals of neighborhood devices. The information handling system then filters these signals for nearby devices based on a threshold for distance. For example, in a data center in which the server rack aisles (e.g., server rack aisles A and B in FIG. 3) are separated by 0.75 m, the threshold distance can be 0.5 m in order to avoid a neighborhood crossing from one server rack aisle to the next. Depending upon a density of installed systems, it may be desirable to reduce a threshold distance. Threshold distance can be determined based upon a data center set up. Alternatively, threshold distance can be determined automatically based upon local area density data populated by the information handling system. FIG. 4 illustrates five different clusters 410 420, 430, 440, and 450. Clusters can be generated using one of a number of clustering methodologies, including k-means clustering. k-means clustering is a vector quantization method that partitions n instances into k clusters in which each instance belongs to a cluster with a nearest mean that serves as a prototype for the cluster. There are a variety of known methods for performing k-means clustering in the art and embodiments of the present invention are not limited to a particular one of those methods. In one embodiment, k is determined using a divisive k search in which k is initialized as the number of nodes, k clusters are formed using k means, if all nodes are covered then k is reduced and clusters are formed again, otherwise k is increased and k clusters are formed again.

For each cluster, lead nodes and backup lead nodes are selected. The lead node is the mesh network node closest to a centroid of the cluster, while backup leads are assigned based on how close a mesh network node is to the centroid. As will be discussed in further detail below, a lead node plays an important role in inter- and intra-cluster communication. Embodiments provide that a lead node is responsible for relaying information to each node within a cluster, neighboring lead nodes, and the data center management system, as well as accumulating information regarding nodes in a cluster. As illustrated in FIG. 4, lead nodes for each cluster are as follows: [A0,4] (410), [A2,4] (420), [A1,10] (430), [A0,15] (440), and [A1,19] (450).

FIG. 4 further illustrates a new information handling system 460 inserted in slot [A2,18] and labeled NN (i.e., new node). The following discussion related to the process followed for insertion of a new node will reference NN and the surrounding clusters illustrated in FIG. 4.

Figure 5:
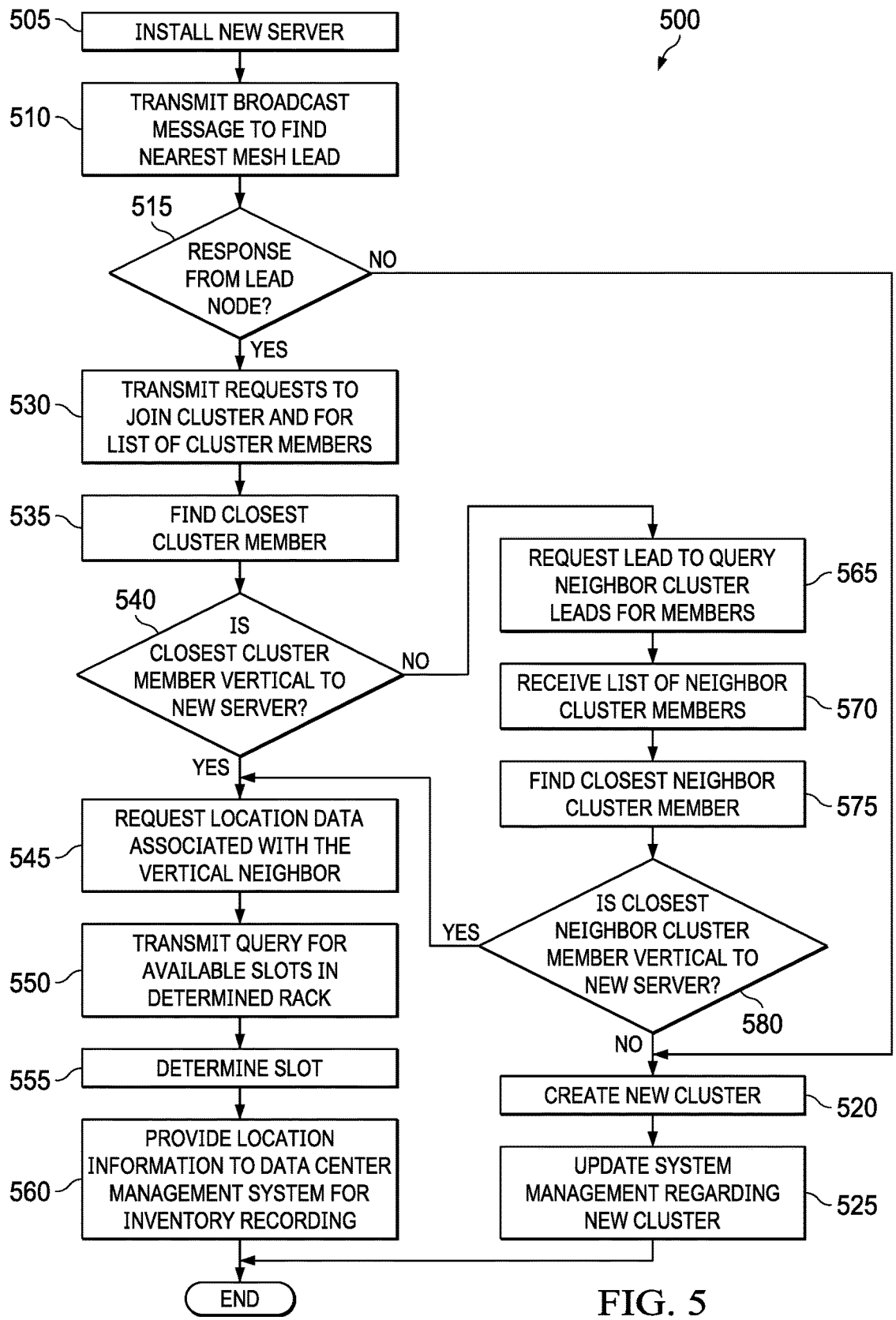
FIG. 5 is a simplified flow diagram illustrating an example process executed by an information handling system for locating the system and informing data center management of that information, in accord with embodiments of the present invention.

FIG. 5 is a simplified flow diagram illustrating an example process 500 executed by an information handling system for locating the system and informing data center management of that information, in accord with embodiments of the present invention. As an initial step, the newly-added information handling system (e.g., NN 460) is installed in a server rack (505). Such an installation is performed by data center personnel and can involve coupling power, networks, and other peripherals to the information handling system. Once the information handling system is brought up to power, the newly-added information handling system transmits a broadcast message using a short-range communication module to a nearest mesh lead node (510). If no response is received from a lead node (515), this is an indication that there is no cluster within range of the newly-added information handling system and that a new cluster should be created (520). In such a case, the newly-added information handling system identifies itself as a lead node and such information can then be provided to data center management system 250 (525). Receipt of such information by data center management system 250 will result in a notification to data center management personnel to manually assign initial parameters regarding location of the newly-added information handling system. Such information can be provided by, for example, an operator of a mobile service device 260, and can include, for example, slot, rack identifier, aisle, room, floor, and the like.

If the newly-added information handling system does receive a response from a neighboring lead node (515), then the newly-added information handling system can transmit requests to join the cluster led by the lead node and for a list of cluster members (530). When the list of cluster members is received, the newly-added information handling system can query each of the cluster members and utilize location protocols associated with the mesh network to find a closest cluster member (535). The location protocol can be further used to determine whether the found closest cluster member is in an approximately-vertical position to the newly-added information handling system and therefore mounted in the same rack as the newly-added information handling system (540). If the closest cluster member is approximately-vertical to the newly-added information handling system, then the system can request location data associated with the approximately-vertical cluster member (545). This information can be requested from the lead node or the approximately-vertical neighbor.

As an example, NN 460 receives a lead node query response from the lead node for cluster 450 located at [A1,19]. After NN joins cluster 450, the lead node informs NN of the member nodes located at [A1,19], [A1,20], [A1,21], [A2,17] and [A2,20]. NN the uses the location protocols associated with the mesh network (e.g., BLE) to determine that cluster member node at [A2,17] is approximately-vertical to NN. Subsequent to this determination, NN is informed by the cluster lead that [A2,17] is located in rack A2 and slot 17, and that therefore NN is located in rack A2.

Once the newly-added information handling system has determined in which rack the system resides, the system can transmit a query for identification of available slots in the determined rack (550). This request can be made of the cluster lead node or of the data center management system 250, depending upon a configuration of how such information is distributed within the data center network. Based upon the available slot information and a determined distance from the nearest approximately-vertical neighbor, the newly-added information handling system determines the slot in which the system is installed (555). Subsequently, the newly-added information handling system provides location information to the data center management system (e.g. 250) for inventory recording (560).

If there is no closest cluster member that is approximately vertical to the newly-added information handling system (540), then the system can request the lead node to query neighbor cluster leads for member lists (565). The system receives the lists of neighbor cluster members (570) and proceeds to find a closest neighbor cluster member (575). If there is a closest neighbor cluster member approximately vertical to the new system (580), then the newly-added information handling system proceeds to request location data associated with approximately-vertical neighbor (545) and continues with steps 550-560, as discussed above. If there is not a closest neighbor cluster member approximately-vertical to the new system (580), then a new cluster can be created following steps 520-525.

Following the above steps, information regarding location of a newly-added information handling system is automatically generated and provided to the data center management system 250. As will be appreciated, as more systems are included within the mesh network, the mesh becomes more capable of providing location information. For example, a first system in the mesh network will not have any information regarding the data center environment and will need to be provided data manually by data center management. Similarly, when new clusters are formed or there are no vertically-aligned members, location-related information will need to be provided by data center management. But once there is a sufficient population of mesh-connected nodes within the data center, newly-added nodes can determine their location through the location protocols of the mesh network and information provided by members of that mesh network.

Figure 6:
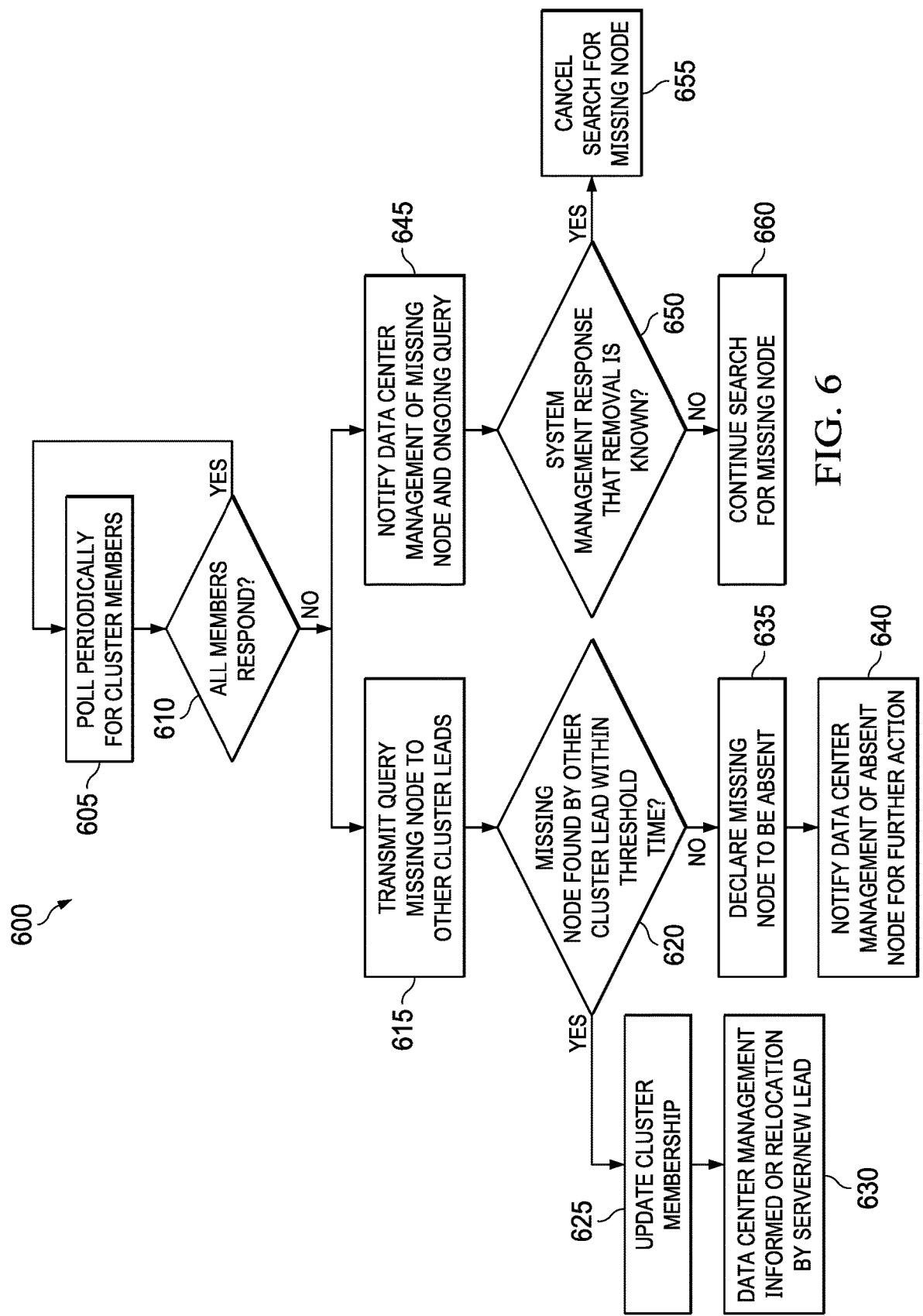
FIG. 6 provides a simplified flow diagram illustrating an example process for detecting removal of a cluster member within a mesh network and for informing data center management of such removal.

FIG. 6 provides a simplified flow diagram illustrating an example process for detecting removal of a cluster member within a mesh network and for informing data center management of such removal. Removal process 600 is performed by a lead of a cluster. The lead node periodically polls each member of the cluster to determine that it is still connected to those nodes (605). If all members of the cluster respond (610) then the lead node waits until the next period to perform polling. Such polling can be performed, for example, every 10 seconds in a BLE mesh network. If a cluster member fails to respond (610), then the lead node performs two different sets of tasks. The lead node will transmit a request to other cluster leads to query for the missing node (615). This is done to determine whether the missing node is merely not communicating with the lead node for some reason but is still present, or the missing node may have been moved to another location within the data center thereby requiring adjustments in the mesh network for that relocation.

If the missing node is found by another cluster lead within the threshold time for such a query (620), then the lead node updates the cluster membership of that lead node (625) to remove the missing node from the cluster. The relocated node and the new lead for that node informs data center management of the relocation for updating the inventory database.

If the missing node is not found by another cluster lead within the threshold time (620), then the lead node declares the missing node to be absent (635) and notifies data center management of the absent node for further action to be taken by system management (640).

In addition to transmitting a query to the other cluster leads, upon determining that a cluster member has not responded, the lead node notifies data center management of the missing node and the ongoing query for the missing node (645). If system management responds that the removal of the missing node is a known event (650), then the lead node can cancel the search for the missing node (655), including requesting the other lead nodes to cancel their queries for the missing node. If system management responds that the removal is not known or does not respond to the notification (650), then the lead nodes continue their search query for the missing node (660).

Figure 7:
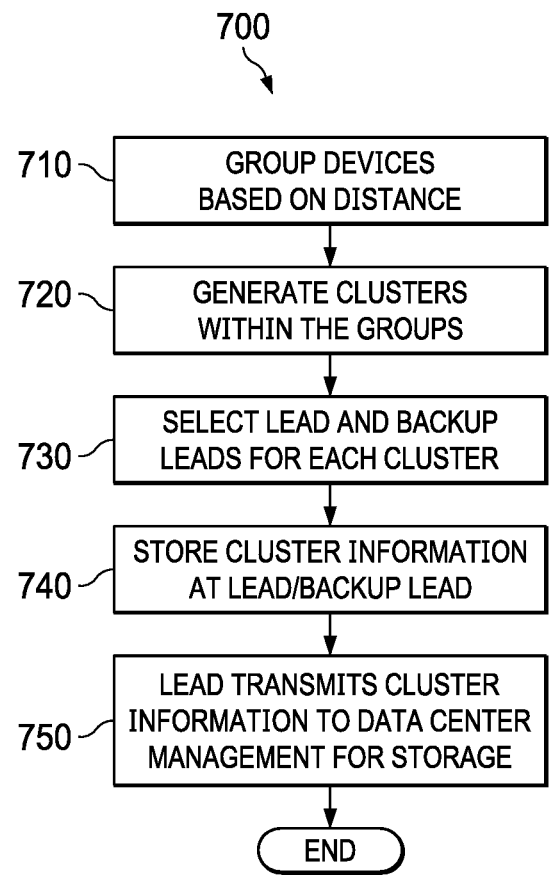
FIG. 7 is a simplified flow diagram illustrating an example process for forming clusters within a mesh network, in accord with embodiments of the present system.

FIG. 7 is a simplified flow diagram illustrating an example process 700 for forming clusters within a mesh network, in accord with embodiments of the present system. Once a mesh network is formed, devices within the network can be grouped based upon their distance from one another as determined using location services provided by the mesh network protocol (710). As discussed above, the parameters used to perform this grouping can be determined by the physical layout of the data center so that only desirable groupings can result. For example, setting threshold grouping distances such that a group cannot span a gap between server racks (e.g., an aisle between server racks). Alternatively, groupings can be determined using placement density of nodes determined by the location determination module 120.

Once grouping has been performed, clusters can be generated within the various groups (720). As discussed above, clustering is performed to enhance local responsiveness of the network to newly-added nodes, as well as providing local management of mesh network information such as physical location and reducing a number of nodes over which information needs to be distributed from central management nodes (e.g. lead nodes). As discussed above, an example method for cluster formation is k-means clustering, which can use an iterative determination of clusters and cluster lead nodes. Once the clusters have been determined, a lead node and backup lead nodes are selected for each cluster by determining a centroid of the cluster (e.g., a least number of hops from each cluster node to the centroid node) and selecting the nodes closest to the centroid as the lead and backup leads (730).

As discussed above, the lead node performs various management tasks associated with the cluster, including, for example, responding to queries from cluster member nodes, providing information the cluster member nodes, communicating with neighbor cluster lead nodes, storing and providing information related to the cluster to both cluster members and to querying systems (e.g., data center management system 250). Thus, the cluster-related information is stored at the lead node and the backup lead nodes (740). Such information can include, for example, an identifier for each cluster member node, service tag information, location of each cluster member node (e.g., room, aisle, rack, and slot number), and network information associated with communicating with each cluster member node. The lead node then transmits the cluster information to data center management system 250 for storage and other tasks associated with managing the data system (750). It should be noted that as nodes are added to the data center, clusters and cluster lead nodes can be re-determined in order to account for changes in density and location of nodes.

Embodiments of the present system provide a mechanism by which location-related information associated with various information handling systems installed within a data center can automatically be determined and communicated with a data center management system. Once this information is provided to the data center management system, the data can be used to perform multiple interactions from a management perspective including, for example, actions based on location or room or rack or aisle. Such automated inventory information is additionally useful in conjunction with mobile service devices (e.g., 260) when a user requires a view of what racks have location information populated, and if not, then assigning such information when viewing the rack. Utilizing this information in an augmented reality set up, such as that described above, provides empty slot information to data center management personnel and can recommend empty slots for insertion of new servers. In addition, in light of the real-time nature of embodiments of the present system, fast response can be made by data center management when an information handling system disappears from the mesh network, either due to benign or malicious means.

As will be appreciated by one skilled in the art, aspects of the present invention may be embodied as a method, system, or computer program product. Accordingly, aspects may be implemented entirely in hardware, entirely in software (including firmware, resident software, micro-code, etc.) or in an embodiment combining software and hardware. These various embodiments may all generally be referred to herein as a "circuit," "module," or "system." Furthermore, embodiments may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of embodiments of the present invention may be written in an object-oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Embodiments of the present invention are well adapted to attain the advantages mentioned as well as others inherent therein. While the present disclosure has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for locating a first node in a data center, the method comprising:
   joining, by the first node, a mesh network in the data center, said joining the mesh network comprising
      requesting, by the first node, to join a cluster of one or more nodes within the mesh network, wherein
         the request is transmitted to a lead node of the cluster if the lead node responds to the request to join the mesh network, and
         the mesh network comprises one or more clusters each having a corresponding lead node;
   determining, by the first node, a physical location of the first node within the data center using information provided by the mesh network, said determining the physical location comprising
      finding a second node that is positioned physically approximately vertical to the first node, said finding the second node comprising
         requesting a list of cluster members from the lead node;
         finding, by the first node, a physically closest cluster member to the first node; and
         determining whether the physically closest cluster member is positioned approximately physically vertical to the first node; and
      requesting location information associated with the second node wherein the location information comprises a server rack identifier; and
   informing a data center management system of the location of the first node.

2. The method of claim 1, wherein the lead node of the cluster is a physically closest lead node to the first node.

3. The method of claim 1 further comprising:
   using a mesh network location protocol to perform said finding the physically closest cluster member and said determining whether the physically closest cluster member is positioned approximately physically vertical to the first node.

4. The method of claim 1 further comprising if the physically closest cluster member is not positioned approximately physically vertical to the first node:
   requesting a list of neighbor cluster members from a neighbor cluster to the cluster;
   finding a physically closest neighbor cluster member to the first node; and
   determining whether the physically closest neighbor cluster member is positioned approximately physically vertical to the first node.

5. The method of claim 4 wherein said requesting the list of neighbor cluster members comprises requesting the lead node to request the list of neighbor cluster members from a neighbor lead node of the neighbor cluster.

6. The method of claim 1 wherein said determining the physical location of the first node further comprises:
   requesting, by the first node, identification of filled slots in the server rack identified by the server rack identifier;
   determining a distance from the second node to the first node; and
   determining a slot occupied by the first node in the server rack using the distance and the information associated with filled slots in the server rack.

7. The method of claim 6 wherein the information regarding filled slots is provided by one of the lead node or the data center management system.

8. The method of claim 6 further comprising:
   using the mesh network location protocol to perform said determining the distance from the second node to the first node.

9. The method of claim 1 wherein, if a lead node does not respond to the request to join the mesh network, said joining the mesh network further comprises creating a new cluster having the first node as the lead node.

10. The method of claim 9 wherein said determining the physical location of the first node comprises:
    requesting, by the first node, the physical location information from the data center management system; and
    storing the physical location information at the first node.

11. The method of claim 1 further comprising:
    removing the first node from the mesh network; and
    informing, by the lead node, the data center management system of the removal of the first node.

12. The method of claim 1 wherein the location of the first node comprises identifiers for one or more of building, room, aisle, server rack, and slot.

13. An information handling system comprising:
    a processor;
    a first network interface, coupled to the processor and a first network, and configured to communicate with a data center management system coupled to the first network;
    a wireless network interface, coupled to the processor, and configured to communicate with a wireless mesh network in a data center, and
       determine a relative location of the information handling system to one or more wireless mesh network member nodes; and
    a non-transitory, computer-readable storage medium embodying computer program code, the non-transitory, computer-readable storage medium being coupled to the processor, the computer program code interacting with a plurality of computer operations and comprising instructions executable by the processor and configured to cause the processor to:
       join the wireless mesh network, the instructions to cause the processor to join the wireless mesh network further comprise instructions configured to cause the processor to:
          request to join a cluster of one or more nodes within the mesh network, wherein
             the request is transmitted, by the wireless network interface, to a lead node of the cluster if the lead node responds to the request to join the mesh network, and
             the mesh network comprises one or more clusters each having a corresponding lead node,
       determine a physical location of the information handling system within the data center using information provided by the mesh network, the instructions to determine the physical location of the information handling system further comprise instructions configured to cause the processor to:
          find a second node that is positioned approximately physically vertical to the information handling system, the instructions to find the second node further comprise instructions configured to cause the processor to:
             request a list of cluster members from the lead node;

find a physically closest cluster member to the information handling system; and determine whether the physically closest cluster member is positioned approximately physically vertical to the information handing system; and request location information associated with the second node wherein the location information comprises a server rack identifier, and inform a data center management system of the physical location of the information handling system.

14. The information handling system of claim 13, wherein the instructions executable by the processor are further configured to cause the processor to, if the physically closest cluster member is not positioned approximately physically vertical to the information handling system:

request a list of neighbor cluster members from a neighbor cluster to the cluster;

find a physically closest neighbor cluster member to the information handling system; and determine whether the physically closest neighbor cluster member is positioned approximately physically vertical to the information handling system.

* * * * *